Feb. 2, 1965 SHUICHIRO TAKAHASHI ETAL 3,168,399
METHOD OF PRODUCING CIRCULARLY CYLINDRICAL
MEMBERS OF MATERIAL COMPOSED ESSENTIALLY
OF ZIRCONIUM AND/OR NIOBIUM
Filed May 9, 1961
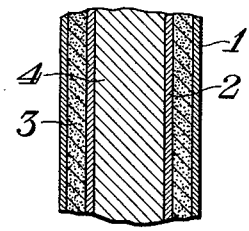
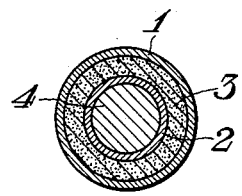
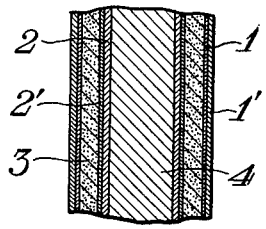
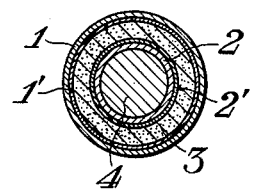
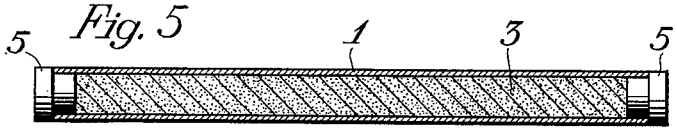

United States Patent Office 3,168,399
Patented Feb. 2, 1965

3,168,399
METHOD OF PRODUCING CIRCULARLY CYLIN-DRICAL MEMBERS OF MATERIAL COMPOSED ESSENTIALLY OF ZIRCONIUM AND/OR NIO-BIUM
Shuichiro Takahashi, Yutaka Honda, Tatsuo Maekawa, and Yukio Ikawa, Omiya, and Sueo Yamamori, Amagasaki, Japan, assignors to Mitsubishi Atomic Power Industries, Inc., and Mitsubishi Denki Kabushiki-Kaisha, Tokyo, Japan, both corporations of Japan
Filed May 9, 1961, Ser. No. 108,781
Claims priority, application Japan, May 11, 1960, 35/23,483, 35/23,484
10 Claims. (Cl. 75—208)

This invention relates to a method of producing circularly cylindrical members of a material composed essentially of zirconium and/or niobium and more particularly to a method of producing tubes and bars of circular cross section composed of such a material.

Since zirconium and niobium have high melting points, good mechanical properties and a high anticorrosive property at high temperatures they are widely used as structural materials for nuclear reactors. Further, as they, when pure, have low absorption cross sections for thermal neutrons they are advantageously used as cladding tubes for solid or hollow nuclear fuel elements composed essentially of ceramic nuclear fuel materials such as uranium dioxide ($UO_2$) and uranium carbide (UC). However, as zirconium and niobium have melting points of approximately 1830° C. and 2415° C., respectively, the conventional powder metallurgical process for producing bars is required to comprise the steps of press-shaping under a pressure of from 30 to 95 kg./mm.$^2$ and vacuum sintering for a period of time of from several scores of minutes to several hours at a temperature of from 1200° C. to 1300° C. for zirconium, or press-shaping under a pressure of from 15 to 39 kg./mm.$^2$ and vacuum sintering for a period of time of from several scores of minutes to several hours at a temperature of from 1900° C. to 2300° C. for niobium. In producing tubes of such materials, it is additionally required to bore the sintered bodies and then to effect drawing, extruding and the like. For these reasons, in the production of such bars and tubes it is necessary to use many steps and long periods of time, resulting in expensive products.

An object of the invention is to provide an improved method whereby circularly cylindrical members and more particularly tubes and/or bars of circular cross section can be inexpensively produced from materials having high melting points without any difficulty.

According to one aspect of the invention there is provided a method of producing a tube of circular cross section composed of at least one of the metals zirconium and niobium, comprising the steps of disposing coaxially a pair of metallic tubular members of circular cross section having different diameters to form an annular space therebetween, fitting into the interior of the internal tube a metallic mandrel member having the corresponding diameter, filling up the annular space with a powder of a material selected from the group consisting of zirconium, base alloys thereof, niobium, base alloys thereof and zirconium-niobium alloys to a high density and then closing the ends of the annular space, subjecting an element thus prepared to a swaging operation at a temperature between room temperature and approximately 1000° C., and preferably approximately one third of the melting point of the used powder, to thereby densify and sinter the mass of the powder to a high density, and removing the metallic members by mechanical and chemical means.

If desired, the internal tubular member may be eliminated. In this case the external tubular member and the mandrel disposed coaxially with the same form said annular space.

In order to facilitate the removal of the tubular members after the completion of swaging, the surface or surfaces of the same brought into contact with the powder may be lined with a layer of copper having a realtively small thickness.

According to another aspect to the invention, there is provided a method of producing a bar of circular cross section composed of at least one of the metals zirconium and niobium, comprising the steps of filling up the interior of a metallic tubular member of circular cross section with a powder of a material selected from the group consisting of zirconium, base alloys thereof, niobium, base alloys thereof and zirconium-niobium alloys to a high density and then closing the ends of the tubular member, subjecting an element thus prepared to a swaging operation at a temperature between room temperature and approximately 1000° C., and preferably approximately one third of the melting point of the used powder, to thereby densify and sinter the mass of the powder to a high density, and removing the tubular member by mechanical and chemical means.

As in producing the tubes, the metallic tubular member may be lined with a layer of copper in order to facilitate the removal of the same after the completion of swaging.

The swaging operation is preferably performed by a plurality of passes to effect progressively the reduction of area. It can be satisfactorily performed at room temperature. However, in order to effect more perfect sintering, the swaging operation may be performed by a desired number of passes at room temperature and one or more succeeding passes at a temperature not exceeding one third of the melting point of the raw powdered material used. With a stainless steel used as the material for the cladding tubular member, hot swaging may be effectively performed at a temperature not more than 1000° C.

The invention will be more readily apparent from the following detailed description taken in conjunction with the accompanying drawing in which:

FIG. 1 ishows schematically a fragmental longitudinal sectional view of a raw element constructed according to the teaching of one aspect of the invention directed to the production of a tube and ready for subjecting the same to a swaging operation according to the invention;

FIG. 2 shows a cross sectional view of the element illustrated in FIG. 1;

FIGS. 3 and 4 show views similar to FIGS. 1 and 2 but illustrate a modification; and FIG. 5 shows a longitudinal sectional view of a raw element constructed according to the teaching of another aspect of the invention directed to the production of a bar and ready for subjecting the same to a swaging operation according to the invention.

As previously described, the production of a circular tube utilizes a pair of tubular members disposed coaxially with each other or an external tubular member and a mandrel disposed coaxially with the same to define the outer and inner surfaces of the tube whereas the production of a circular bar utilizes a tubular member to define the outer surface of the bar. However, the other process steps are identical in both cases. Therefore, the invention will be described in more detail in terms of the production of tubes.

Referring now to FIGS. 1 and 2 of the drawing, there is illustrated a raw element constructed in accordance with the teaching of one aspect of the invention directed to the production of a tube and ready for subjecting the same to a swaging operation according to the invention. Disposed within a tubular member of circular cross section 1 having a larger diameter is another tubular member of circular cross section 2 having a smaller diameter coaxially with each other to form an annular space therebetween. The external and internal tubular members may be preferably made of a stainless steel or any other suitable material. The criterion of selecting a material for the tubular members is that any selected material is not reactive with respect to zirconium or niobium of which a desired tube is to be made, during the swaging operation, and that it cannot only resist a repeated, high dynamic stress resulting from swaging that but also it can readily be removed after the completion of the swaging operation. For these reasons, stainless steel and copper are preferably used.

A mandrel member 4 is then snugly fitted into the interior of the internal tubular member 2 followed by the closing of one end of an arrangement comprising the external and internal tubular members and the mandrel member. In order to close the end of such an arrangement, a plug (not shown) which may be preferably made of a material similar to the tubular members can be welded or brazed to that end of the external tubular member with the end portions of the internal tubular member and the mandrel inserted into a central opening formed in the plug and then caulked thereto. The mandrel is preferably made of copper or its alloys because it has a high ductility and can readily be removed. Also zinc alloys having low melting points may be advantageously employed.

The annular space formed between the external and internal tubular members 1 and 2 respectively can now be filled up with a powder of a material 3 compounded essentially of either zirconium or niobium to a high density. Then the other end of each of the tubular members and the mandrel is closed by using a similar plug in the same manner as above described in conjunction with the closing of the first end thereof. The powdered material to be charged into the space may be a powder of zirconium or niobium alone, any base alloy thereof, any zirconium-niobium base alloy or a mixture of zirconium or niobium and an element or elements to be alloyed therewith. Examples of such elements include tin, iron, chromium, nickel, etc. For example, a powder may be employed comprising 1.3 to 1.6% of tin, 0.07 to 0.7% of iron, 0.03 to 0.16% of chromium, 0.03 to 0.08% of nickel and the balance zirconium. In any case, any powder used should be essentially composed of at least one of the metals zirconium and niobium and has preferably an average particle size of from approximately 1 mm. to 0.1 mm. or less.

A bar-shaped element prepared in the manner thus far described can now be subjected to a swaging operation according to the teaching of the invention. The swaging operation is preferably performed by a plurality of passes to effect progressively the reduction of area. During the swaging operation the mass of the powder filled within the bar-shaped element is subjected to high compressive stresses rapidly repeated. This accelerates not only the compression and plastic deformation of the filled mass but also the atomic diffusion due to both the generation of heat and the dynamic stress whereby the densification and sintering proceeds until the mass of the powder will be converted into a densified, sintered tubular member having a high density capable of exceeding 98% of its theoretical value.

The swaging operation as just described can be satisfactorily performed at room temperature. However, if the swaging operation comprises a desired number of passes effected at room temperature and one or more succeeding passes effected at elevated temperature then the sintering can be more perfectly effected. It has been found that the elevated temperature is only required to be less than approximately one third of the melting point of a powder used. Also, it has been found that with zirconium or base alloys thereof, the hot swaging is preferably performed at a temperature ranging from 600 to 500° C. whereas with niobium or base alloys thereof it is preferably performed at approximately 700° C. The microscopic examinations indicated that the use of such temperature results in dense, sintered tubular members having fiber structures.

It is to be understood that the elevated temperature at which the hot swaging is performed depends upon a hot-workability of the material of a cladding tube or tubes. Further, it is well known that the higher a temperature is the more easily densification and sintering is effected. Therefore, if a stainless steel is used as a material of a cladding tube for a powder the hot-swaging may be performed up to 1000° C. for densifying and sintering more perfectly the powder. While the swaging operation according to the invention may be performed at a temperature above 1000° C. the use of such a temperature is a waste of energy. It is to be noted that, if the mandrel 4 is made of a low melting point alloy such as a zinc alloy, the temperature should be less than its melting point. Accordingly, the invention is advantageous over the conventional sintering processes in which a sintering temperature ranges from 1200° to 1300° C. for zirconium whereas it ranges from 1900° to 2300° C. for niobium as previously described.

A cold swaged tubular member according to the invention may be, if desired, annealed and then subjected to the hot swaging as just described. Alternatively, the annealing and hot swaging steps may be repeated as desired.

After the mass of the filled metallic powder has been perfectly densified and sintered by subjecting the bar-shaped element to a swaging operation as above described, the external and internal cladding tubular members 1 and 2 respectively, the mandrel 4, and the plugs can be removed by mechanical means such as cutting or by a melting process or by dissolving out with a mineral acid such as sulfuric acid, hydrochloric acid, nitric acid etc. Thereby a tubular member composed essentially of either zirconium or niobium can be obtained having a dimension determined by the cladding tubes 1 and 2. If a radial distance between the cladding tubes is relatively small, the resulting tubular member will have a relatively thin wall.

Further, it has been found that a double-walled tube comprising a tube of a hard material such as a stainless steel and a copper tube jointed to the same can be advantageously used as a cladding tube for a mass of powder used. In this case, an external cladding tube comprises an outer tube composed of said hard material and an inner tube composed of copper whereas an internal cladding tube comprises an outer tube composed of copper and an inner tube composed of said hard material. This arrangement facilitates the removal of the cladding tubes after the completion of the swaging operation. This results from the fact that the copper tube can be easily dissolved out with any suitable mineral acid.

FIGS. 3 and 4 show a bar-shaped element constructed in accordance with one aspect of the invention as just described and ready for subjecting the same to the swaging operation according to the invention. The same reference numerals designate like parts and the reference numerals 1′ and 2′ represent the copper tubes as above described.

If desired, the internal cladding tube and the mandrel may be replaced by the latter alone.

It will be appreciated that, after the bar-shaped element shown in FIGS. 3 and 4 has been subjected to the swaging operation according to the invention followed by the removal of the outer tube 1, the densified, sintered tubular member covered with the copper tube 1′ can be subjected to a swaging or drawing operation or the like with the copper tube finally removed by using any suitable mineral acid. Such subsequent operation is possible because the sintered tubular member is uniform.

An example of the invention will now be described.

Disposed within an external cladding tube of a stainless steel having an outside diameter of 17 mm. and a wall thickness of 0.5 mm. was an internal tube of copper having an inside diameter of 8.5 mm. and a wall-thickness of 0.5 mm. coaxially with each other with one end of the external tube rigidly connected to the corresponding end of the internal tube by a plug having a central opening. One end of the etxernal tube was welded to the plug while the corresponding end of the internal tube was fitted into the central opening of the plug and then caulked thereto, thereby the end of each tube was sealed. A mandrel of a zinc alloy then was fitted into the copper tube with a clearance therebetween less than 0.1 mm. Then the annular space formed between the tubes was filled up with a zirconium powder at a tapped density equal to 44% of the theoretical value. Thereafter the other end of each tube was similarly closed with a plug.

A bar-shaped element thus prepared was subjected to cold-swaging to effect a reduction of area of 48%. The swaged element was placed in a furnace at 500° C. where the mandrel was melted out. The internal tube was dissolved out by using a solution of 50% hydrochloric acid. After being fully rinsed and dried, the external tube was cut out resulting in a zicronium tube having an outside diameter of 11.1 mm. and a wall thickness of 1.7 mm.

A similar bar-shaped element comprising similar tubes and mandrel as in the above example and a niobium powder filled up at a tapped density equal to 59% of the theoretical value was similarly cold-swaged to a reduction of area of 35%. The resulting niobium tube had an outside diameter of 12.5 mm. and a wall thickness of 2.5 mm.

It should be noted that the figures of reduction-of-area as above mentioned and as will be mentioned hereinafter were determined with respect to the entirety of the bar-shaped element but not with the tubular member of zirconium or niobium.

The conditions for the swaging operation according to the invention are listed by way of example in the following table.

| Material | Run No. | Tapped Density | Total Reduction of Area | Swaging Temperature for Last Pass | Swaged Density |
|---|---|---|---|---|---|
| Zirconium | 1 | 46.8 | 49.6 | Room Temperature. | 97.3 |
|  | 2 | 47.3 | 50.5 | 200 | 97.7 |
|  | 3 | 46.5 | 50.5 | 400 | 98.1 |
|  | 4 | 46.2 | 51.3 | 600 | 99.8 |
|  | 5 | 47.3 | 52.0 | 800 | 98.8 |
| Niobium | 11 | 59.0 | 46.8 | Room Temperature. | 92.2 |
|  | 12 | 56.6 | 49.5 | 600 | 94.3 |
|  | 13 | 58.7 | 49.5 | 1,000 | 97.5 |

The tapped and swaged densities are represented by percentages based upon the theoretical value of density. As to run numbers other than Nos. 1 and 11, the last pass was effected at the indicated temperature to effect a reduction of area of about 5% with the preceding passes being effected at room temperature.

The above table shows that the swaged densities for niobium are less than those for zirconium. This appears to result from the fact that the niobium used was one available in the market and contained some content of its oxide. It is believed that the use of highly pure niobium will result in a swaged density higher than those illustrated in the above table.

It will readily be seen that a bar can similarly be produced with the internal tube and the mandrel eliminated. Therefore, the foregoing description is applicable to the production of bars composed essentially of zicronium or niobium.

FIG. 5 illustrates a bar-shaped element constructed according to the teaching of the invention and ready for subjecting the same to a swaging operation according to the invention. The same reference numerals indicate like components and the reference numeral 5 designates a plug for closing an end of a cladding tube 1.

A powder of zirconium or niobium filled up and sealed within a cladding tube of a stainless steel having an outside diameter of 12 mm. and a wall thickness of 1 mm. was swaged. As in the case of producing a tube, only the last swaging process was performed at an elevated temperature with the preceding swaging being performed at room temperature.

For zirconium the hot-swaging was performed at 600° C. resulting in a bar having an outside diameter of 6.5 mm. and a density reaching 99% of its theoretical value with the total reduction of area being 50%. For niobium the hot-swaging was performed at 1000° C. resulting in a bar having an outside diameter of 6.7 mm. and a density reaching 98% of its theoretical value with the total reduction of area being 47%.

From the foregoing it will be appreciated that the invention has provided a method of easily producing tubes and bars composed essentially of at least one of the metals zirconium and niobium, wherein the operating temperature is less than that used with the conventional powder metallurgical process.

While the invention has been described in conjunction with certain preferred embodiments thereof it is to be understood that various changes and modifications may be made without departing from the spirit and scope of the invention.

What we claim is:

1. A method of producing a tube of circular cross section composed essentially of at least one member of the group consisting of zirconium and niobium, comprising the steps of disposing coaxially a pair of metallic tubular members of circular cross section having different diameters to form an annular space therebetween, fitting into the interior of the internal tube a metallic mandrel member having the corresponding diameter, filling up the annular space with a powder of a material selected from the group consisting of zirconium, base alloys thereof, niobium, base alloys thereof and zirconium-niobium alloys to a high density and then closing the ends of the annular space, subjecting an element thus prepared to a swaging operation at a temperature between room temperature and approximately one third of the melting point of the used powder to thereby densify and sinter the mass of the powder to a high density, and removing the metallic members by mechanical and chemical means.

2. A method of producing a tube of circular cross section composed essentially of at least one member of the group consisting of zirconium and niobium, comprising the steps of disposing a metallic mandrel member of circular cross section coaxially with and within a metallc tubular member to form an annular space therebetween, filling up the annular space with a powder of a material selected from the group consisting of zirconium, base alloys thereof, niobium, base alloys thereof and zirconium-niobium alloys to a high density and then closing the ends of the annular space, subjecting an element thus prepared to a swaging operation at a temperature between room temperature and approximately one third of the melting point of the used powder to thereby densify and sinter the mass of the powder to a high density, and removing the metallic members by mechanical and chemical means.

3. A method as claimed in claim 1, wherein the swaging operation is performed by a plurality of passes at room temperature.

4. A method as claimed in claim 2, wherein the swaging operation is performed by a plurality of passes at room temperature.

5. A method as claimed in claim 1, wherein the swaging operation is performed by a plurality of passes at room temperature and at least one last pass at an elevated temperature up to approximately one third of the melting point of the used powder.

6. A method as claimed in claim 2, wherein the swaging operation is performed by a plurality of passes at room temperature and at least one last pass at an elevated temperature up to approximately one third of the melting point of the used powder.

7. A method of producing a tube of circular cross section composed essentially of at least one member of the group consisting of zirconium and niobium, comprising the steps of disposing coaxially a pair of stainless steel tubular members of circular cross section having different diameters to form an annular space therebetween, fitting into the interior of the internal tube a metallic mandrel member having the corresponding diameter, filling up the annular space with a powder of a material selected from the group consisting of zirconium, base alloys thereof, niobium, base alloys thereof and zirconium-niobium alloys to a high density and then closing the ends of the annular space, subjecting an element thus prepared to a swaging operation at a temperature between room temperature and approximately 1000° C. to thereby densify and sinter the mass of the powder to a high density, and removing the metallic members by mechanical and chemical means.

8. A method of producing a tube of circular cross section composed essentially of at least one member of the group consisting of zirconium and niobium, comprising the steps of disposing a metallic mandrel member of circular cross section coaxially with and within a stainless steel tubular member to form an annular space therebetween, filling up the annular space with a powder of a material selected from the groups consisting of zirconium, base alloys thereof, niobium, base alloys thereof and zirconium-niobium alloys to a high density and then closing the ends of the annular space, subjecting an element thus prepared to a swaging operation at a temperature between room temperature and approximately 1000° C. to thereby densify and sinter the mass of the powder to a high density, and removing the metallic members by mechanical and chemical means.

9. A method as claimed in claim 1, wherein at least the external tubular member includes an inner wall consisting of a copper layer having a relatively small thickness.

10. A method as claimed in claim 2, wherein at least the external tubular member includes an inner wall consisting of a copper layer having a relatively small thickness.

References Cited by the Examiner
UNITED STATES PATENTS

| 2,373,405 | 4/45 | Lowit | 75—214 |
|---|---|---|---|
| 3,004,907 | 10/61 | Precht et al. | 176—82 |

OTHER REFERENCES

Long et al.: "Sheath Working of Metal Powders," U.S. Dept. of Interior Publication R.I. 4464, February 1949, pp. 1–7. U.S. Bureau of Mines, Report of Investigations.

"Nuclear Metallurgy" (vol. 5), IMD Special Report Series No. 7. Publ. by AIMME, 1958, pp. 1–11.

CARL D. QUARFORTH, *Primary Examiner.*

OSCAR R. VERTIZ, *Examiner.*